July 15, 1969 M. M. MATTIA 3,455,089
PROCESS FOR REMOVING ORGANIC CONTAMINANTS FROM AIR
Filed Nov. 29, 1967
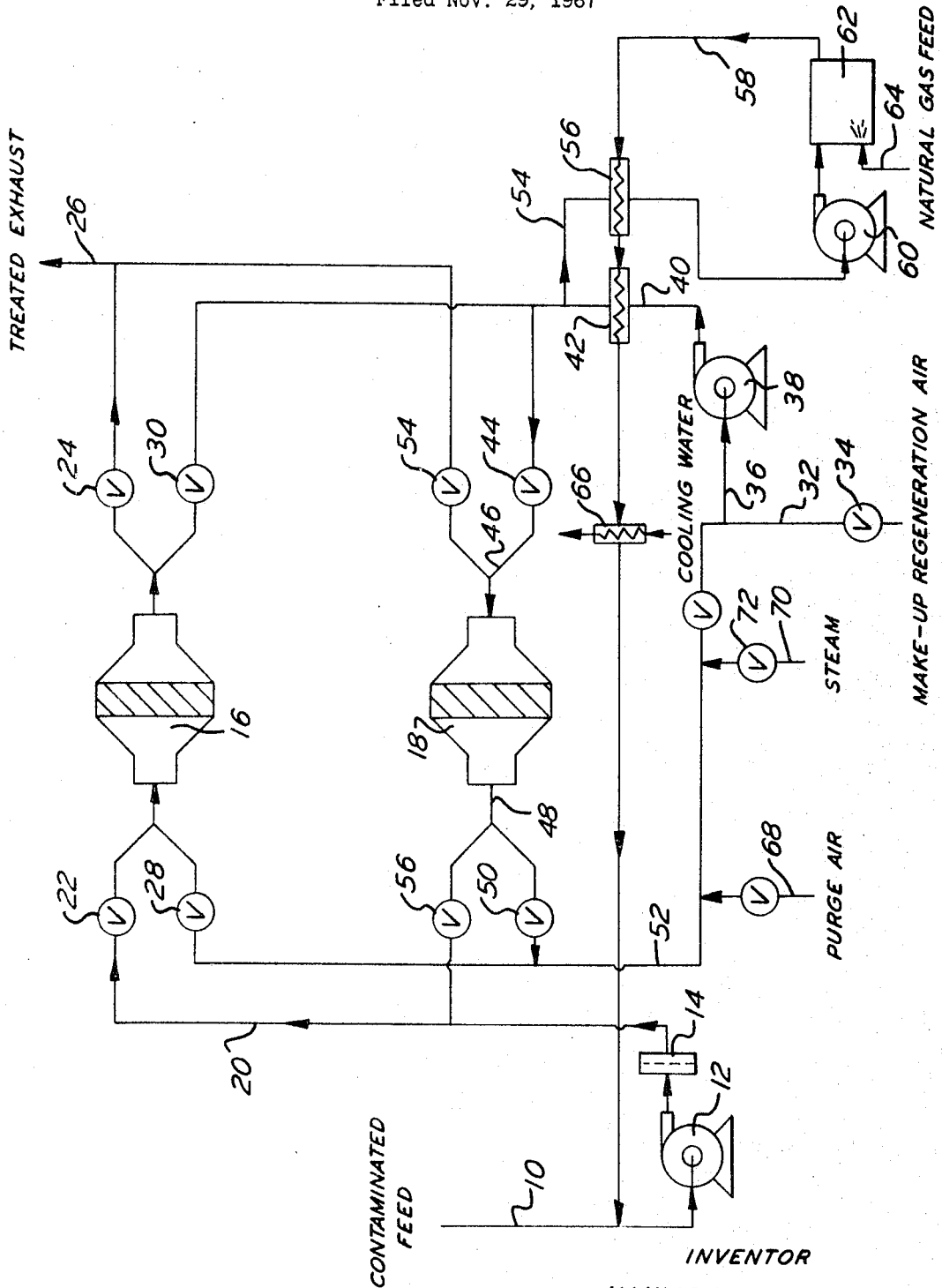
INVENTOR
MANLIO M. MATTIA
BY Seidel & Gonda
ATTORNEYS.

United States Patent Office 3,455,089
Patented July 15, 1969

3,455,089
**PROCESS FOR REMOVING ORGANIC
CONTAMINANTS FROM AIR**
Manlio M. Mattia, Ridley Park, Pa., assignor to Day
& Zimmermann, Inc., Philadelphia, Pa., a corporation
of Maryland
Filed Nov. 29, 1967, Ser. No. 686,478
Int. Cl. B01j *1/22;* B01d *53/04*
U.S. Cl. 55—62                             4 Claims

ABSTRACT OF THE DISCLOSURE

A process for removing organic contaminants from air by adsorption, wherein the absorbed contaminant is used as fuel to provide heat for regeneration of the adsorbent material.

---

This invention relates to a process for removing organic contaminants from air, and more particularly, to a process wherein organic contaminants are removed from air by adsorption.

A major part of industrial air pollution results from exhausting large volumes of air contaminated with organic vapors at concentrations too small to recover economically. Numerous industrial processes lead to such contamination, which of course poses a serious safety and health hazard, as well as an economic problem due to contamination or "poisoning" of chemical processes carried on in the same plant area. Known processes which have been considered for removing such pollutants have proven to be either too expensive or impractical. The present process permits purification of the air, at minimal operating cost, to the extent where it can be recycled back into the plant area. This could provide the added benefit of reducing the large heating and air-conditioning loads in process plants which require frequent air changes to maintain adequate ventilation.

It has heretofore been proposed to strip constituents from a gaseous mixture by passing the mixture through an adsorbent bed. Thus, for example, in Patent 2,434,419, it was proposed to dehumidify hydrocarbon gases by passing them through beds of activated bauxite. It has also been proposed to regenerate the adsorber, when saturated, by heating; and in the above-mentioned Patent 2,434,419, to heat the adsorber by heat exchange with combustion products of the treated hydrocarbon gas.

The present invention has as one of its principal objects the purification of air, or in its broadest sense, contaminated gases not themselves combustible. Thus, the present process contemplates using organic contaminants driven from the adsorbers during regeneration as fuel for heating the regenerating gases. Although the "raw" contaminated air is not itself combustible, the regenerating gases become sufficiently enriched with respect to the organic contaminants to sustain combustion in a suitable air incinerator or catalytic combustion chamber. Natural gas fuel may be added, if needed, as an aid to combustion and to supply additional heat. The combustion products may impart their heat to the regeneration gas, directly or indirectly, and the combustion products are preferably recycled through the adsorber so that only treated exhaust leaves the system.

In view of the foregoing, the present invention has as a general object the provision of a process for removing organic contaminants from gases, and in particular, from air.

The present invention has as another object the provision of a process wherein organic contaminants are removed from air by adsorption, and wherein the adsorbers are regenerated.

A still further object of this invention is to provide a process whereby the organic contaminants removed from the air are used as fuel to provide heat for regeneration of the adsorbers.

Yet another object of this invention is to provide a process wherein gas for regenerating an adsorber is recycled to the adsorber to provide a clean decontaminated exhaust.

Other objects will appear hereinafter.

In its broadest aspect, the present invention may be used to remove organic contaminants from non-combustible gases, the contaminants providing fuel for regeneration of the adsorbers. The foregoing may be accomplished without interruption by a plurality of discrete parallel adsorbers, with one or more of the adsorbers being regenerated while one or more remain on stream. Thus, regeneration can be accomplished without shut-down.

For the sake of illustration, the process of the present invention will be described in respect to a contaminated feed containing acetone as the organic contaminant. However, it is to be understood that the subject invention may be used in respect to a wide variety of other organic contaminants such as paraffin hydrocarbons, olefins, aromatics, alcohols, aldehydes, ethers, and esters. The source of the contaminant, namely the contaminated feed, may be a process exhaust, or contaminated air from a plant area.

The contaminated feed centers through intake 10 and fan 12. Fan 12 provides a pressure head sufficient to insure flow in the system. A filter 14 may be provided downstream of the fan 12 if removal of entrained particles is necessary or desirable. The filter 14 may be of the conventional cloth bag or glass fiber type, and serves to remove dust or other fine particles from the contaminated feed. Such dust or other fine particles might clog or otherwise damage the adsorbers.

Preferably, as shown in the drawing, parallel adsorbers 16 and 18 are provided. This enables one adsorber 16 to be on stream, while the other adsorber 18 may be undergoing regeneration. However, the process of the present invention is applicable both to a single adsorber, and to a larger number of adsorbers.

The construction of the adsorbers 16 and 18, per se, forms no part of the present invention. Thus, any one of a wide variety of suitable adsorbents, such as activated carbon or silica gel, may be used in any of a wide variety of suitable constructions.

Since adsorber 16 is on-stream, the contaminated feed from filter 14 passes through line 20 and valve 22 into adsorber 16. The organic contaminant is removed by the adsorbent bed within adsorber 16. The treated air from adsorber 16 passes through valve 24 into line 26. From line 26 the treated air may be vented to the atmosphere and/or recycled to the plant area for process, by suitable valving (not shown).

While adsorber 16 is on-stream, its valves 28 and 30 are closed.

The adsorber 18 is, as above-indicated, undergoing regeneration. Such regeneration is accomplished by blowing a hot regeneration gas, such as air, through the adsorber bed to drive off the adsorbed organic contaminant, and then driving cooled regeneration gas and purging gas through the bed and associated lines and valves.

The regeneration of adsorber 18 is accomplished by introducing make-up regeneration air from line 32 and valve 34 through line 36, and fan 38 into line 40. Fan 38 provides the necessary regeneration pressure head. The heat exchanger 42 is in indirect heat-exchange relationship in respect to line 40 and heats the regeneration gas in line 40 to the desired regeneration temperature. Such regeneration gas then flows through valve 44 and line 46 into adsorber 18.

The heated regeneration gas removes the adsorbed organic contaminant from the adsorbent bed in adsorber 18, and the enriched heated regeneration gas from adsorber 18 goes through line 48 and valve 50 into recycle line 52.

While adsorber 18 is being regenerated, its valves 54 and 56 are closed.

From recycle line 52 the enriched regeneration gas is recycled through fan 38 and heat exchanger 42.

A portion of the enriched regeneration gas is removed as a slipstream through line 54, and passes through heat exchanger 56 where it is heated by indirect heat exchange with heated gas from line 58. From line 54 the heated slipstream goes through incinerator fan 60 into air incinerator or catalytic combustion chamber 62. The make-up regeneration air flow through line 32 is equal to the slipstream flow in line 54 to the air incinerator or catalytic combustion chamber 62.

The construction of air incinerator or catalytic combustion chamber 62 forms no part of the present invention, since a wide variety of suitable air incinerators and catalytic combustion chambers are known.

If the enriched regeneration gas does not contain sufficient organic contaminant to effect combustion within air incinerator 62, then natural gas from line 64 may be added to the air incinerator 62.

The combustion products from the air incinerator 62 provide the means whereby the regeneration air is heated, and the organic contaminant released from the adsorber during regeneration provides part or all of the fuel for the air incinerator 62.

For safety reasons, the concentration of the organic contaminant in the slipstream 54 should always be below the lower limit of inflammability for that particular organic contaminant at room temperature and atmospheric pressure, and preferably such concentration should be within the range of from 20 to 40 percent of the lower limit of inflammability at room temperature and atmospheric pressure. The limits of inflammability of organic contaminants are well known and reported in the literature, see for example the table appearing in the Handbook of Chemistry and Physics, 46th Edition, 1965–66, page D–54, published by The Chemical Rubber Company. The range of 20 to 40 percent of the lower limit of inflammability at room temperature (70° F.) and atmospheric pressure is a good range for the operation of a catalytic combustion chamber for most organic contaminants.

By way of example, when the contaminated feed is contaminated by acetone vapor in the amount of 50 to 5000 parts per million by volume (0.005 to 0.5% by volume) the acetone enriched slipstream will contain ideally, 5100 to 10,200 parts per million by volume (0.51 to 1.02% by volume) of acetone. This will be about 20 to 40 percent of the lower limit of inflammability of the acetone.

As above-indicated, the unit 62 may be an air incinerator devoid of catalyst. In such cases, the enrichment with natural gas from line 64 will be more common, with the amount of such enrichment depending on the nature of the organic contaminant.

The heat from the hot gases leaving the air incinerator 62 is shown in the illustrated embodiment as being transferred to the regeneration air in line 40 and the slipstream in line 54 by indirect heat exchange through suitable heat exchangers 42 and 56 respectively. Alternatively, in place of the heat exchangers 42 and 56, the regeneration air may be heated by directly mixing with it the combustion products from the air incinerator 62.

The heat exchanger 66 in line 58 may be used to cool the combustion products further (assuming that further cooling of such combustion products is desirable after their passage through the heat exchangers 56 and 42) by indirect heat exchange with cooling water. The combustion products may then be added to the contaminated feed in line 10.

After the adsorbent bed in adsorber 18 has been regenerated, it may be purged with purge air from line 68 which can be added to line 52. The purge air may be from any suitable source, and may comprise the plant or process air. It may comprise the same source as line 32. If a different source of purge air is used, the flow of regeneration air through line 32 is closed during purging by closing valves 34.

The purge air may be used to cool the adsorbent bed in adsorber 18, as well as to effect its purging.

In many cases it is desirable to introduce steam so as to control the humidity of the regeneration air or of the purge air. This can be done by passing steam from line 70 and valve 72 into line 52.

After adsorber 18 has been purged, it may be placed on-stream by closing valves 44 and 50 and opening valves 56 and 54.

Adsorber 16 may be taken off-stream and purged by closing valves 22 and 24 and opening valves 30 and 28.

Since the gases exhausted from the present process including combustion products, regeneration air and purge air are treated by adsorption, the exhaust air from line 26 is of high purity.

The process of the present invention enables contaminated feed containing a dilute concentration of organic contaminant to provide the necessary heat by the combustion of the stripped organic contaminant within the air incinerator or catalytic combustion chamber 62 to heat the regeneration air. Moreover, the process of the present invention provides for close temperature control, and permits the subject process to be used on a wide variety of contaminated feed sources with a wide variety of regeneration temperatures. For example, the regeneration temperature may be regulated, as desired, such as a regeneration temperature of 300° F. or more, by control of the amount of the slipstream sent to the air incinerator 62, and/or the amount of natural gas feed introduced through line 64.

The concentration of the contaminant in the regeneration air will vary during the course of the regeneration, therefore the flow rate to the air incinerator 62 and/or the addition of natural gas may require adjustment. This permits control as to the rate and extent of regeneration.

The exhaust from line 26 may have its temperature regulated by the rate of flow of the cooling water through heat exchanger 66 so that the temperature of the air returned from line 26 to the plant or to the process can likewise be closely regulated.

The process of the present invention enables adsorbent beds, such as activated charcoal, to be used which are adversely affected by very high temperatures, such as those that would be encountered by the direct burning of the adsorbed contaminant from the adsorbent bed.

The present invention may be embodied in other specific forms without departing from the spirit or essential attributees thereof and, accordingly, reference should be made to the appended claims, rather than to the foregoing specification as indicating the scope of the invention.

I claim:

1. A process for removing combustible organic contaminant from contaminated air comprising contacting said contaminated air with an adsorbent material to adsorb contaminant from said air upon the adsorbent material, periodically regenerating said contaminant-bearing adsorbent material by passing hot regeneration air through said contaminant-bearing adsorbent material to drive off the contaminants and yield a contaminant-enriched air mixture, with the amount of combustible organic contaminant in said contaminant-enriched air mixture being below the lower limit of inflammability of the organic contaminant at room temperature and atmospheric pressure, drawing off a portion of said contaminant-enriched air mixture, burning said drawn-off portion, and using heat evolved in burning said drawn-off portion to heat said regeneration air.

2. A process in accordance with claim 1, wherein said regeneration comprises passing purging air through said adsorbent material to remove regeneration air from said adsorbent material, and recycling said purging air and regeneration air through adsorbent material.

3. A process in accordance with claim 1 wherein the heat evolved in burning said drawn-off portion is transferred to said regenerating air by indirect heat transfer, and the combustion products evolved are recycled through adsorbent material.

4. A process in accordance with claim 1 in which the concentration of the organic contaminant in the drawn-off portion is 20 to 40% by volume of the lower limit of inflammability of the organic contaminant at room temperature and atmospheric pressure.

References Cited

UNITED STATES PATENTS

| 3,137,549 | 6/1964 | Kilgore et al. | 55—62 |
| 3,176,445 | 4/1965 | Collins et al. | 55—179 |
| 3,205,639 | 9/1965 | Johnson et al. | 55—62 |

REUBEN FRIEDMAN, Primary Examiner

CHARLES N. HART, Assistant Examiner

U.S. Cl. X.R.

55—74, 179